United States Patent

[11] 3,626,206

[72] Inventor Russel T. Stebbins
 Mountain View, Calif.
[21] Appl. No. 72,897
[22] Filed Sept. 16, 1970
[45] Patented Dec. 7, 1971
[73] Assignee Itek Corporation
 Lexington, Mass.
 Continuation of application Ser. No.
 690,647, Dec. 14, 1967, now abandoned.
 This application Sept. 16, 1970, Ser. No.
 72,897

[54] CIRCUIT MEANS FOR CYCLICALLY MONITORING AND INDICATING THE CONDITION OF A FUNCTION
 13 Claims, 3 Drawing Figs.
[52] U.S. Cl. .................................................. 307/235,
 235/153, 307/223, 307/229, 328/43, 328/48,
 328/148, 340/347
[51] Int. Cl. ...................................................... H03k 5/20
[50] Field of Search .......................................... 235/92,
 153; 307/221, 223, 229; 324/235, 990, 115, 153;
 328/43, 48, 103, 105, 106, 116, 146, 147, 148,
 151; 340/146.1, 146.2, 347

[56] References Cited
UNITED STATES PATENTS
| | | | |
|---|---|---|---|
| 3,192,371 | 6/1965 | Brahm............................ | 340/347 X |
| 3,221,253 | 11/1965 | Keyes............................. | 324/99 D |
| 3,267,375 | 8/1966 | Olsen............................. | 324/103 |
| 3,278,727 | 10/1966 | Geis............................... | 307/223 X |
| 3,467,958 | 9/1969 | McKinney..................... | 340/347 |
| 3,518,660 | 6/1970 | Nicklas et al. ................ | 340/347 |

Primary Examiner—Donald D. Forrer
Assistant Examiner—R. C. Woodbridge
Attorneys—Harvey G. Lowhurst, Homer O. Blair, Robert L. Nathans and Lester S. Goldberg ABSTRACT: A stepping chain-type digitizer for monitoring the condition of a function and for converting the condition into true and false conditions of the steps of the chain whereby any change of the monitored condition produces a change in the condition of the steps. The steps of the stepping chain are utilized to control inhibitor gates placed in the stages of the normally free-running ring counter. Any stage of the ring counter controlled by a step in a selected condition remains in the "on" position after the counter advances to turn it "on," and thereby stops any further advance of the ring counter. The stage of the ring counter which remains locked in the "on" position provides the indication of the condition of the monitored function.

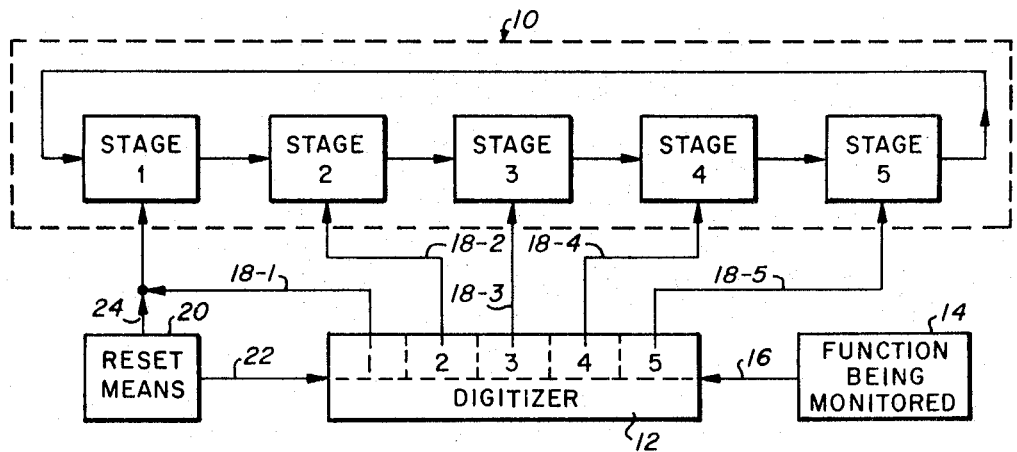
Fig_1
| VOLTAGE RANGES | DIGITIZER STAGE | | | | |
|---|---|---|---|---|---|
| | 1 | 2 | 3 | 4 | 5 |
| 0 → 1 | 0 | 0 | 0 | 0 | 1 |
| 1 → 2 | 0 | 0 | 0 | 1 | X |
| 2 → 3 | 0 | 0 | 1 | X | X |
| 3 → 4 | 0 | 1 | X | X | X |
| 4 → 5 | 1 | X | X | X | X |
Fig_2
INVENTOR
RUSSELL T. STEBBINS
BY
ATTORNEY

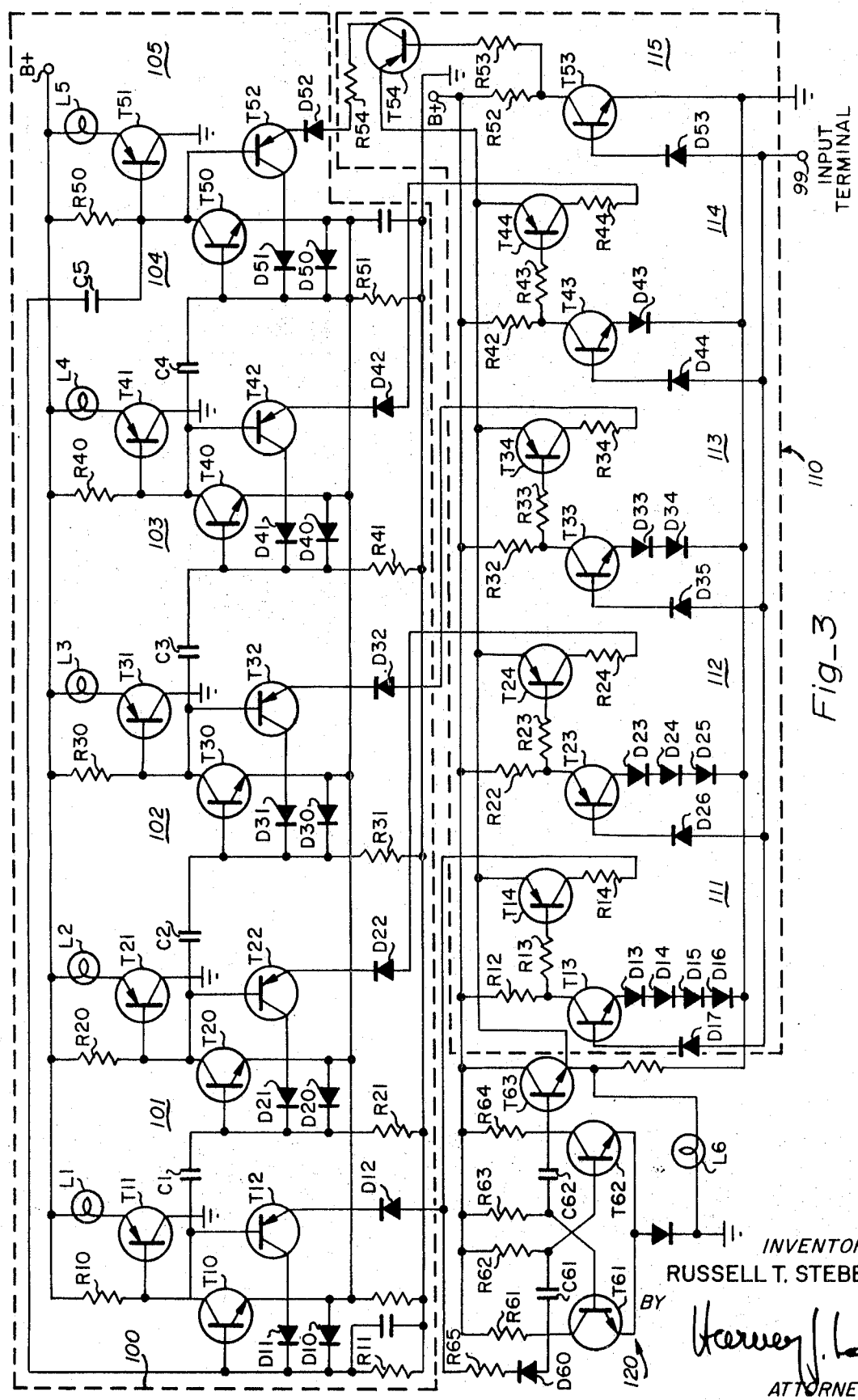
Fig_3

3,626,206

CIRCUIT MEANS FOR CYCLICALLY MONITORING AND INDICATING THE CONDITION OF A FUNCTION

This is a continuation of Ser. No. 690,647 filed Dec. 14, 1967.

BACKGROUND OF THE INVENTION

1. Field of the Invention

This invention relates to apparatus for cyclically monitoring and continuously indicating the condition of a function, and, more particularly, to a monitoring and indicating system which continually and cyclically provides an indication of a digitized quantity.

It is often highly desirable to derive an indication whether a certain function is above, below, or within one or more preselected ranges without actually undertaking a numerical evaluation of the quantity being measured. For example, when checking the reflectivity of a surface during a manufacturing process, the actual reflectivity is easily measured by determining the current originated by a photoelectric sensor exposed to light reflected from the surface, or, the voltage across a resistor in the photoelectric cell circuit. If the total range of reflectivity is expressed in some arbitrary units ranging from one to five, and only surfaces having a reflectivity between three and four are determined as acceptable, the apparatus of this invention is ideally suited for providing an indication of an acceptable reflectivity without actually obtaining the numerical value of the reflectivity. In other words, this device is eminently suitable for automatically and continually testing, measuring, or otherwise monitoring a specified condition of a function which may be the reflectivity of a surface as described above or any other function such as resistivity, cleanliness, hardness, inductivity, to mention only a few.

2. Description of the Prior Art

Heretofore, a number of circuits have been in use for monitoring the condition of a function, most of which are of the metering type providing an indication of the actual condition of the function. One such device is the voltmeter.

Each of these devices, whatever may be their construction, are deficient with respect to one or more of the following. They do not provide a simple indication of an acceptable range of conditions of the function which is cyclically repeated at a readily selectable repetition frequency, which is efficient, reliable, inexpensive, substantially foolproof, and readily adaptable to automatic processing.

It is, therefore, an object of the present invention to provide a circuit by which a cyclically repeating indication of the condition of a function being monitored can be obtained.

It is a further object of the present invention to provide a circuit for monitoring a function and for providing an indication on the basis of which it is immediately determinable that the function falls within or without certain preselected limits.

It is still another object of the invention to digitize the condition of a function by means of a stepping chain and to monitor the condition of each step to thereby determine the condition of the function.

It is also an object of the invention to convert an analog signal to a digital signal and to cyclically and continuously monitor the digital signal to determine the condition of an analog function.

It is a further object of the invention to utilize a normally free-running ring counter to monitor a stepping chain which in turn is set to reflect the present condition of an analog function.

SUMMARY OF THE INVENTION

In accordance with one embodiment of the present invention, the condition of a function such as the magnitude of a voltage, is digitized by means of a stepping chain or digitizer having a preselected number of steps or output stages. The output stages of the digitizer are either at a first potential signifying a true condition, or at a second potential signifying a false condition, depending on the amplitude of the voltage being monitored. Each time the amplitude of the voltage being monitored increases by one digit, the stepping chain steps forward by one step and the output stage corresponding to this step changes either from true to false, or from false to true.

The output stages of the digitizer are continually being monitored by a normally free-running ring counter having a number of stages which corresponds to the number of steps of the stepping chain. Each stage of the ring counter monitors a different step of the digitizer, and includes a locking means which is responsive to the condition of the monitored step, and which will lock the counter stage and thereby the ring counter from further advance when the monitored step is in a selected (or true) condition.

There is also provided a cycle signal which unblocks the locked stage of the ring counter, and which resets the ring counter to start a new cycle with stage "one." During the new cycle, the ring counter will again stop its advance when reaching a stage receiving a true signal from the digitizer. The stage at which the ring counter stops thereby provides an indication of the condition of the function being monitored which is cyclically repeated so that the indication of the function being monitored determined by the ring counter is constantly checked.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which

BRIEF DESCRIPTION OF THE DRAWINGS

FIG. 1 is a schematic block diagram of a cyclically monitoring and indicating circuit constructed in accordance with the present invention;

FIG. 2 is a truth table for the digitizer shown in FIG. 1; and

FIG. 3 is a schematic circuit diagram of an exemplary embodiment of a cyclically monitoring and indicating circuit incorporating the present invention.

DESCRIPTION OF THE PREFERRED EMBODIMENT

Referring now to FIG. 1 of the drawing, there is shown a free-running ring counter 10 comprised of five stages which are identified as Stages 1 to Stage 5. There is further provided a digitizer 12, which may take the form of a stepping chain, for monitoring a function 14 connected thereto by means of conductor 16. Digitizer 12 has five output positions which are identified and will be referred to as Steps 1 to Step 5, or Output Stages 1 to Output Stage 5. Conductors 18–1 to 18–5 respectively couple Steps 1–5 to Stages 1–5 so that each stage monitors a different output stage of digitizer 12.

Each of the stages in ring counter 10 includes a locking circuit which is responsive to the condition of the associated digitizer step and operative to lock the stage in the "on" condition after the stage is turned "on" by the advancing ring counter.

Finally, there is provided a reset means 20 which has one of its output terminals connected to digitizer 12 through conductor 22, and the other of its output terminals connected to the locking circuit of Stage 1 through conductor 24.

The operation of the device shown in FIG. 1 will now be explained. Ring counter 10 is, except for the locking circuit in each stage, a normally free-running ring counter in which one stage is normally "on" while all remaining stages are normally "off," and in which the "on" condition of the stages advances sequentially from one stage to the next. Stage 1 has been arbitrarily selected as the starting stage since reset means 20 is connected thereto and will turn this stage to the "on" condition after reset. Ring counter 10, because of the locking circuit in each stage, is free-running only as long as the condition of Steps 1–5 is "false," indicating the steps at a second potential. As soon as a step changes to a true condition, it energizes the lockup circuit in the stage to which it is connected, and maintains that stage is the "on" condition after the ring counter turns it "on."

Digitizer 12, which may take the form of a stepping chain, is a means for converting an analog input signal applied to it on conductor 12 into a digital output signal having selected steps. By way of illustration, but not limitation, an example of a digital code is shown in FIG. 2 which is suitable of monitoring the amplitude of a voltage, which may range anywhere between 0 and 5 volts. The condition being monitored is one in which of five ranges the voltage amplitude is at any time.

FIG. 2 is a truth table for a digitizer having five steps for indicating the amplitude of the voltages in five ranges. If the applied voltage is between 0 and 1 volt, Step 5 becomes true which is indicated by the number 1 in the truth table, and all other steps remain false which is indicated by the number 0 in the truth table. If the applied voltage is between 1 and 2 volts, Step 4 becomes true, and Steps 1–3 remains false, the condition of remaining Step 5 being of no importance which is indicated in the truth table. Similarly, each time the applied voltage increases above 2,3 and 4 volts, the true condition of the steps changes from Step 3 to Step 1 as indicated in the truth table.

Assume next that the function being monitored is at a potential whose voltage is between 1 and 2 volts. According to the truth table, Steps 1, 2 and 3 are false, Step 4 is true, and Step 5 is of no consequence. Further assume that this occurs at the instant of time that Stage 1 of counter 10 is in the "on" condition. Since Steps 1, 2 and 3 are "false," counter 10 will advance and sequentially turn on Stage 2, Stage 3 and Stage 4. However, since Step 4 is true, indicating that the function being monitored is between 1 and 2 volts, the locking circuit in Stage 4 is energized, and Stage 4 will remain "on," giving an indication that the function being monitored has a voltage in the 1 to 2-volt range.

Reset means 20 may take the form of a free-running astable multivibrator having a frequency which is equal to the desired cyclic repetition rate for monitoring the function. In operation, reset means 20 provides a disable pulse on lead 22 which disables digitizer 12, and resets the same so that all steps are "false." This releases the locking signal allowing the ring counter to continue its advance. Simultaneously with the disable pulse, reset means provides a true signal on lead 24 to lock Stage 1 and to thereby read the circuit for making a new determination of the condition of the function being monitored. As soon as reset means 20 releases the system, that is, at the end of the disable pulse and true pulse, a new cycle starts. For convenience of determining the stage which is "on," a driver with a light source may be provided.

Referring now to FIG. 3, the circuit there shown has been found eminently suitable to monitor a function applied to it at input terminology. The illustrated circuit includes a ring counter 100, having five Stages 101, 102, 103, 104 and 105. Stage 101 is comprised of an NPN-Transistor T10 forming the main element of the first stage which is coupled to the preceding Stage 105 through a coupling capacitor C5, and which in turn is coupled to the succeeding Stage 102 through coupling capacitor C1. Transistor T10 is conventionally connected between a B+ supply (28 volts DC) and ground, the collector being connected to the B+ supply through a resistor R10, and the emitter being connected to ground through a resistor R11. There is also provided a diode D10 which connects the emitter of transistor T10 to the base, the base being in the coupling circuit from the preceding stage. The time during which Stage 101 normally remains "on" is determined by the time constant capacitor C1 and resistor R21 in the emitter circuit of the transistor of the next succeeding stage.

In order to obtain an indication that a particular stage is "on," a driver in the form of PNP-transistor T11 is provided which has an indicator lamp L1 connected between its emitter and B+ supply. The base of transistor T11 is connected to the collector of transistor T10.

Similarly, Stage 102 is comprised of an NPN-transistor T20 forming the main element of the second stage, and a PNP-transistor T21 for driving an indicator lamp L2. The time during which Stage 102 remains "on" after having been turned "on" is determined by the time constant of capacitor C2 and resistor R31 which determines when the next stage will be turned "on." The remaining Stages 103, 104 and 105 are constructed in a similar manner, each including an NPN-transistor forming the main element, a PNP-transistor transistor for driving a lamp and a coupling circuit of a preselected time constant for turning on the successive stage.

Normally, ring counter 100 is free-running and operates in the following manner. Assume that transistor T10 is initially conducting to thereby supply base current to transistor T11 which is connected in emitter follower configuration to drive indicator lamp L1. When transistor T10 is "on," its collector is negative and maintains coupling capacitor C1 negative. When transistor T10 is turned "off," its collector swings positive and charges coupling capacitor C1 thus turning "on" T20. Capacitor C1 will discharge through resistor R21 and, upon being discharged, turn off transistor T20 which, in turn, will turn "on" transistor T30.

Each stage of ring counter 100 further includes a lockup circuit which is comprised of a transistor controllable by the collector of the stage transistor. More particularly, Stage 101 is provided with a PNP-transistor T12 which has its base connected to the collector of transistor T10 and its collector to the base of transistor T10 through a diode D11 so that, if a positive voltage is applied to the emitter of lockup transistor T12, transistor T10 remains turned "on." The signal applied to the emitter of T12 is also referred to as a locking signal, or a true signal, if it is positive and maintains the associated stage in the "on" condition.

The operation of the lockup circuit is as follows: Assume initially that voltage applied to input terminal 99 is above 3.2 and below 4.0 volts, then transistors T53, T43 and T33 will be turned "on" and, in turn, turn "on" transistors T54, T44 and off," Turning "on" transistor T34 applies a positive voltage from the collector across diode D32 to the emitter of transistor T32. As long as transistor T30 is "off," nothing happens because the base of transistor T32 is positive. As soon as transistor T30 is turned "on" by the ring action, its collector swings negative to thereby turn "on" locking transistor T32. This, in turn, swings the collector of transistor T32 positive to thereby maintain the base electrode of transistor T30 positive, and maintains transistor T30 on biased regardless of the voltage on coupling capacitor C2. In this manner, Stage 103 of ring counter 100 remains locked up until reset by astable device 120.

There is further provided a digitizer or stepping chain 110 which has five output stages or steps identified by reference characters 111, 112, 113, 114 and 115. As will become better understood hereinafter, each step of stepping chain 110 is connected to a stage of ring counter 100. The connection between Step 111 and Stage 101 is from resistor R14 to diode D12, between Step 112 and Stage 102 is from resistor R24 to diode D22, between Step 113 and Stage 103 is from resistor R34 to diode D32, between Step 114 and Stage 104 is from resistor R44 to diode D42, and between Step 115 to Stage 105 is from resistor R54 to diode D52.

Step 111 of digitizer 110 is comprised of a pair of transistors, such as NPN-transistor T13 and PNP-transistor T14, which are connected in such a manner that when transistor T13 is turned "on" it turns "on" transistor T14. Turning on of transistor T14 generates a true signal on its collector which is applied, through resistor R14 and diode D12, to lockup circuit transistor T12 of Stage 101 which, as has already been explained, locks the ring counter.

More particularly, transistor T13 has its emitter connected to ground through four series-connected diodes D13, D14, D15 and D16, and has its emitter connected to a source of B+ through biasing resistor R12. The base of transistor T13 is connected, through a suitable isolation diode D17, to digitizer input terminal 99, having connected thereto the function to be monitored. The base of transistor T14 is connected, through a resistor R13, to the collector of transistor T13 and the emitter of transistor T14 is connected to the source of B+ which is controlled by a switched transistor T63 which, as will be explained hereinafter, forms part of a reset means 120. Finally, the collector of transistor T13 is connected through resistor R14, as already mentioned, to the emitter of transistor T12 forming the lockup transistor of Stage 101 of ring counter 100.

The operation of Step 111 is as follows—if the function being monitored by connection to terminal 99 is sufficiently large to turn on step transistor T13 it, in turn, will turn on output transistor T14 and a true signal will be applied to lockup circuit transistor T12. The voltage necessary to turn on step transistor T13 is readily calculable since the voltage drop across each diode and across each transistor is approximately 0.8 volts for current flow. Accordingly, since the connection between terminal 99 and ground through transistor T13 includes five diodes and one transistor, the minimum voltage necessary is 4.8 volts. If the voltage is less than 4.8 volts, transistor T13 will remain turned "off" and the signal applied to transistor T12 remains "false."

The remaining steps of digitizer 110 are similarly constructed. Stage 112 includes a step transistor T23 which has its collector connected to ground through three serially connected diodes, D23, D24 and D25, and its emitter connected to the B+ supply through resistor R22. The base of transistor T23 is connected, through an isolated diode D26, to terminal 99. Output transistor T24 has its base connected to the emitter of transistor T23 through resistor R23, and its collector is connected through a resistor R24 and a diode D22 to the lockup circuit transistor T22 of Stage 102.

The remaining Stages 113, 114 and 115 are constructed similarly to Stages 111 and 112 except that each succeeding stage has one less diode in the emitter circuit of its step transistors T33, T43 and T53 respectively. Accordingly, a voltage between 1.6 and 2.4 volts is required to turn "on" transistor T53 to cause lockup of counter Stage 105, a voltage between 2.4 and 3.2 volts is required to turn "on" transistor T43 to cause lockup of Stage 104, a voltage between 3.2 and 4.0 volts is required to turn "on" transistor T33 to cause lockup of Stage 103, and a voltage between 4.0 and 4.8 volts is required to turn "on" transistor T23 to cause lockup of Stage 102.

There is further provided a reset means 120 which is comprised of a pair of transistors T61 and T62 which are interconnected, through capacitors C61 and C62 and resistors R61, R62, R63 and R64, to form a free-running multivibrator having a selected frequency. The collector of transistor T61 is also connected, through a diode D60 and a resistor R65, to diode D12 to cause lockup of Stage 101 when transistor T61 is turned "on" which takes place once each cycle of the frequency of means 120. The collector of transistor T62 is connected to the base of the B+ control transistor T63 to remove B+ voltage from the transistors T14, T24, T34, T44 and T54. When transistor T61 in "on," transistor T62 is "off" which, in turn, turns off transistor T63. Since transistor T63 is connected between the B+ supply and the emitters of transistors T14, T24, T34, T44 and T54, a turning "off" of transistor T63 causes transistors T14, T24, T34, T44 and T44 to be without B+ supply, turning all of them "off." This releases any lockup stages of ring counter 100, except for the lockup of the first stage provided by the output of transistor T61 during its being turned "on."

Accordingly, when transistor T61 is turned "on," reset means 120 releases all locked-up stages and locks up Stages 101. Reset means 120, by virtue of its connection to transistor T63, has an asymmetrically duty cycle so that the time during which transistor T61 is "on" is smaller than the time during which it is "off." A suitable duty cycle is a time ratio of 1:3 and a suitable cycle frequency is one-twentieth [20-second cycle duration with 5 seconds "on" time].

The following circuit component values for the circuit illustrated in FIG. 3 have been found to give satisfactory operation in the monitoring of a voltage at terminal 99, and the lighting up of lamps L1, L2, L3, L4 and L5 when the monitored voltage has the following ranges: 1.0, 1.8, 2.6, 3.4 and 4.2

| | | |
|---|---|---|
| Transistors | T10,T20,T30,T40 and T50: | 2N2222 (NPN) |
| Transistors | T11,T21,T31,T41 and T51: | 2N2907 (PNP) |
| Transistors | T12,T22,T32,T42 and T52: | 2N2907 (PNP) |
| Transistors | T13,T23,T33,T43 and T53: | 2N2222 (NPN) |
| Transistors | T14,T24,T34,T44 and T54: | 2N2907 (PNP) |
| Transistors | T61 and T62: | 2N2222 (NPN) |
| Transistor | T63: | 2N2222 (NPN) |
| Resistors | R10,R20,R30,R40 and R50: | 6.8 kΩ |
| Resistors | R11,R21,R31,R41 and R51: | 4.7 kΩ |
| Resistors | R12,R22,R32,R42 and R52: | 10.0 kΩ |
| Resistors | R13,R23,R33,R43 and R53: | 10.0 k⁻ |
| Resistors | R14,R24,R34,R44 and R54: | 27.0 k⁻ |
| Resistors | R62 and R63: | 100.0 k⁻ |
| Resistors | R61 and R64: | 4.7 k⁻ |
| Capacitors | C1,C2,C3,C4 and C5: | 10 μf. |
| Capacitors | C61 and C62: | 1.0 μf. |
| All diodes: | | 1N4154 |

There has been described hereinabove a circuit suitable for cyclically monitoring the condition of a function to continually ascertain the condition within selected ranges. The circuit is simple, reliable and lends itself ideally to applications where assurance is desired that the monitored function is within a selected range.

What is claimed is:

1. A monitoring circuit for indicating the range within which an analog signal is located among a plurality of preselected ranges comprising:
   digitizer means responsive to said analog signal for deriving a digital signal representing the range within which said analog signal is located among said plurality of ranges;
   counter means having a plurality of stages, each of said stages representing one of said plurality of ranges and being operable in a first and a second condition, said stages being interconnected for switching from said first to said second condition in sequential order from one stage to another such that only one stage is in said second condition at a time; and
   locking means associated with said counter means, said locking means being coupled to said digitizer means and responsive to said digital signal for locking the stage representing the range within which said analog signal is located in the second condition.

2. A monitoring circuit as recited in claim 1 and further including display means coupled to said counter means for identifying the stage of said counter means which is locked in the second condition.

3. A circuit for monitoring and indicating the condition of a function comprising:
   a ring counter including a plurality of stages, each stage being operable in a first and a second condition and all stages being interconnected such that one and only one stage is in said second condition at any time, each stage being associated with a different condition of said function;
   locking means included in each stage, each of said locking means being responsive to a locking signal for locking the stage in said second condition during the occurrence of said locking signal; and
   means for monitoring said function and for providing a locking signal to the stage associated with the monitored condition of said function.

4. A circuit in accordance with claim 3 in which said locking means is operative only on a stage in said second condition and maintains the same in said second condition.

5. A circuit in accordance with claim 3 in which said means for monitoring said function comprises a digitizer including a plurality of output terminals, said digitizer being responsive to said function and operative to apply locking signals to selected output terminals to reflect the monitored condition of said function, each output terminal being coupled to a different locking means.

6. A circuit in accordance with claim 3 in which said means for monitoring said function comprises a stepping chain having a common input terminal and a different output terminal for each step of said stepping chain, said function being monitored being connected to said input terminal and each of said output terminals being coupled to a different locking means.

7. A circuit in accordance with claim 6 in which each output terminal of said stepping chain has a first or a second condition in accordance with the condition of said function and in which said output terminals are coupled to said locking means in a preselected manner.

8. A circuit in accordance with claim 3 which further includes a reset means coupled to a selected stage of said ring counter and to said monitoring means, said reset means being operative to periodically and simultaneously disable said monitoring means from providing locking signals and locking said selected stage in said second condition for a predetermined time interval.

9. A monitoring circuit for deriving an indication of the state of a function, comprising:
digitizer means responsive to said function for deriving a digital signal indicative of the state of said function;
normally free-running ring counter means having a stage for each of said derivable digital signals, said counter means having only one stage in the true condition at any time; and
each stage of said counter means including a locking means, each locking means being connected to said digitizer means for being responsive to a different digital signal for maintaining the stage with which it is associated in the true condition upon the occurrence of the digital signal to which it is responsive.

10. A monitoring circuit in accordance with claim 9 in which the locking means of adjacent stages are made responsive to digital signals which are indicative of adjoining states of said function whereby a change in the state of said function will lock or release immediately adjacent stages of said ring counter means.

11. A monitoring circuit in accordance with claim 9 which further includes a reset means for providing a cyclically recurring reset pulse, said ring counter means being responsive to said reset pulse and operative to set a selected stage to said true condition.

12. A monitoring circuit in accordance with claim 11 in which said digitizer means is responsive to said reset pulse and operative to disable the same from deriving digital signals.

13. A monitoring circuit in accordance with claim 9 in which each stage of said ring counter means includes a stage transistor which is on when the stage is in the true condition, and in which said locking circuit includes a locking transistor which is turned on upon the occurrence of the digital signal to which it is responsive, said locking transistor being connected to maintain said stage transistor on as long as said locking transistor is on.

* * * * *